(12) United States Patent
Lin et al.

(10) Patent No.: US 7,485,229 B2
(45) Date of Patent: Feb. 3, 2009

(54) CLOSED SULFUR CIRCULATION SYSTEM

(75) Inventors: Jin-Gaw Lin, Hsinchu (TW);
Hong-Bang Cheng, Kaohsiung (TW)

(73) Assignee: National Chiao Tung University, Hsinchu (TW)

( * ) Notice: Subject to any disclaimer, the term of this patent is extended or adjusted under 35 U.S.C. 154(b) by 306 days.

(21) Appl. No.: 11/386,556

(22) Filed: Mar. 22, 2006

(65) Prior Publication Data

US 2007/0095750 A1 May 3, 2007

(30) Foreign Application Priority Data

Oct. 27, 2005 (TW) .............................. 94137621 A

(51) Int. Cl.
*C02F 3/28* (2006.01)
(52) U.S. Cl. .................... 210/603; 210/616; 210/903
(58) Field of Classification Search ................ 210/603, 210/615, 616, 617, 631, 194, 198.1, 263, 210/274, 903, 908
See application file for complete search history.

(56) References Cited

U.S. PATENT DOCUMENTS 4,839,052 A * 6/1989 Maree ....................... 210/603

6,599,423 B2 * 7/2003 Boles et al. ................. 210/606
7,025,883 B1 * 4/2006 Olivier ....................... 210/602

FOREIGN PATENT DOCUMENTS

KR 2005068544 * 7/2005

OTHER PUBLICATIONS

•Kim, I. S., Oh, S. B., Bum, M. S., Lee, S. L. and Lee, S. T. (2002). Monitoring the denitrification of wastewater containing high concentrations of nitrate with methanol in a sulfur-packed reactor. Applied Microbiology and Biotechnology, 59(1), 91-96.
•Koening, A. and Liu, L. H. (2002). Use of limestone for pH control in autotrophic denitrification: continuous flow experiments in pilot-scale bed reactors. Journal of Biotechnology, 99(2), pp. 161-171.
•Flere, J. M. and Zhang, T. C. (1999). Nitrate removal with sulfur-limestone autotrophic denitrification processes. Journal of environmental engineering, 125(8), pp. 721-729.
•Sison, N. F.; Hanaki, K. and Matsuo, T. (1996). Denitrification with external carbon source utilizing adsorption and desorption capability of activated carbon. Water Research, 30(1), pp. 217-227.

* cited by examiner

*Primary Examiner*—Fred Prince
(74) *Attorney, Agent, or Firm*—Buckman and Archer

(57) ABSTRACT

The present invention provides a closed sulfur circulation wastewater treatment system, which combines autotrophic and heterotrophic denitrification to recycle sulfates. Particularly, the present invention provides a process and a system for wastewater treatment which effectively process wastewater having both high nitrates and low organic carbonaceous sources, and effectively reduce sulfates by-products.

7 Claims, 1 Drawing Sheet

Drawing

CLOSED SULFUR CIRCULATION SYSTEM

FIELD OF THE INVENTION

The present invention is directed to a closed sulfur circulation wastewater treatment system, which combines autotrophic and heterotrophic denitrification to recycle sulfates. Particularly, the present invention provides a process and a system for wastewater treatment which effectively treats wastewater having both high nitrates and low organic carbonaceous sources, and effectively reduce sulfate by-products.

DESCRIPTION OF THE RELATED PRIOR ART

Denitrification system based on sulfur autotrophic microorganism as primary bacteria is advantageous in that denitrification is effectively performed, even only very low organic carbonaceous sources present in the feed wastewater, thus is used for the treatment of wastewater having both high nitrates and low organic carbonaceous sources. However, elemental sulfur, the electron donor in said system, is converted to high concentration of sulfates after denitrification oxidation in reaction chamber. Therefore, when said autotrophic denitrification is used to treat wastewater having a large amount of nitrates, it is unavoidably to produce a large amount of sulfates and to shorten the usage life of the facilities, and is disadvantageous due to the high manufacturing cost for the need of erosion-resistant facilities. Further, the treated water would contain high concentration of sulfate by-products and is unable to drink, if the wastewater to be treated is underground water or drinking water.

To solve the above drawbacks, U.S. Pat. No. 6,761,828 disclosed a process for treating wastewater by means of converting nitrates to nitrogen gas with a chemical process, which is characterized by adding sulfuric acid and ammonia to eliminate nitrates at reaction condition of 6500 but without boilling, and removing 502 gas from wastewater having nitrates. However, as the operating temperature, according to '828 patent, is up to 6500, it is economically disadvantageous since that a large amount of energy is required and the operating cost is increased highly.

Further, I. S. Kim, et al. "Monitoring the Denitrification of Wastewater Containing High Concentrations of Nitrate with Methanol in a Sulfur-Packed Reactor," Applied Microbiology and Biotechnology, Vol. 59, No. 1, pp. 91-96 (2002) proposed a process for wastewater treatment by utilizing columns packed with solid sulfur particles to perform autotrophic and heterotrophic denitrification simultaneously. The Kim's process (2002) enhances the effect of denitrification and reduces the concentration of sulfates in the treated-water by externally adding organic carbonaceous sources. However, the performance of reducing the concentration of sulfates, the primary by-product thereof, is mainly benefitted by the use of external carbonaceous sources to enhance heterotrophic denitrification, and relatively slow autotrophic denitrification. Therefore, the I. S. Kim, et al. process is not suitable for denitrifying underground water or for drinking water. In addition, cost of externally adding organic carbonaceous sources is also high and the operating risk thus increased.

Further, A. Koenig, et al., "Use of Limestone for pH Control in Autotrophic Denitrification: Continuous Flow Experiments in Pilot-Scale Bed Reactors," Journal of Biotechnology, Vol. 99, No. 2, pp. 161-171 (2002) and J. M. Flere, et al., "Nitrate Removal with Sulfur-Limstone Autotrophic Denitrification Processes," Journal of Environmental Engineering, Vol. 125, No. 8, pp. 721-729 (1999) proposed a denitrification for wastewater treatment by utilizing columns packed with solid sulfur particles and lime. The process is characterized by packing solid sulfur particles and lime with particle diameter of 2.38~4.76 mm in a ratio of solid sulfur particles to lime of 3:1, and elevating the activities of autotrophic denitrification based on sulfur by addition of base. As a result, the elimination of 1g of nitrate achieved by consuming 4 grams of base (as $CaO_3$) in average is found; and the elimination rate is 95% or above while the nitrate loading is between 175~225 g $NO_3$—$N/(m^3 \cdot day)$. However, the process proposed by Flere & Zhang (1999) needs high operating cost and is economically disadvantageous because of pipe blocking caused by $CaCO_3$ crystallization. In addition, since the optimal ratio of solid sulfur particles to lime is correlated to hydraulic retention time and the kind of wastewater, the control of keeping in a proper addition of solid sulfur is difficult in the process of A. Koenig, et al. (2002). Also, as concentration and properties of wastewater is varied with time and the differences of which affect the treatment results, it is difficult to achieve the best denitrification performance.

Further, N. F. Sison, et al., "High Loading Denitrification by Biological Activated Carbon Process," Water Research, Vol. 29, No. 12, pp. 2776-2779 (1995), proposed a process for treating low carbon-to-nitrogen ratio wastewater by utilizing active carbon attached with heterotrophic denitrifying bacteria as packing medium of a columnar reaction chamber. As the adsorption and desorption of contaminants can simultaneously perform by active carbon, organic matters of wastewater thus can be absorbed by a granular active carbon and discharge of untreated organic matters flowing out from a reaction chamber accompanying with treated water could be prevented. In the case of wastewater with low concentration of organics, the organic matters stored in active carbon are again released and further act as electron donor for denitrification. Therefore, sufficient organic matters in wastewater reduce the external addition of organic matters (N. F. Sison, et al., "Denitrification with External Carbon Source Utilizing Adsorption and Desorption Capability of Activated Carbon," Water Research, Vol. 30, No. 1, pp. 217-227 (1996). Though the above process is used for reducing the demand of external carbonaceous sources in a denitrification system, the stability is not obtained when the concentration of organic carbonaceous sources in wastewater is too low, due to the use of heterotrophic microorganism as primary denitrifying bacteria.

SUMMARY OF THE INVENTION

Accordingly, to solve the conventional problems of (1) simultaneously performing autotrophic and heterotrophic denitrification unavoidably produces a large amount of sulfates and effects the quality of treated water; and (2) no sulfate removal mechanism is associated with the simultaneous autotrophic and heterotrophic denitrification, the present invention provides a closed sulfur circulation wastewater treatment system, which combines autotrophic and heterotrophic denitrification to effectively recycle sulfate by-products.

The present inventors have intensively studied on "a process and a system for treating wastewater, which effectively treating wastewater having both high nitrates and low organic carbonaceous sources". Consequently, the use of the process for treating wastewater described below effectively reduces sulfate by-products and solves the above problems, and the present invention is achieved.

That is, the present invention provides a process and a system for treating wastewater, which effectively treats wastewater having both high nitrates and low organic carbonaceous sources, and effectively reduces sulfates by-products. Particularly, the present invention provides a closed sulfur circulation wastewater treatment system, which combines autotrophic and heterotrophic denitrification to recycle sulfates.

BRIEF DESCRIPTION OF THE DRAWING

FIG. 2 is a schematic view showing the device for wastewater treatment according to an embodiment of the present invention, wherein:

Figure 1:
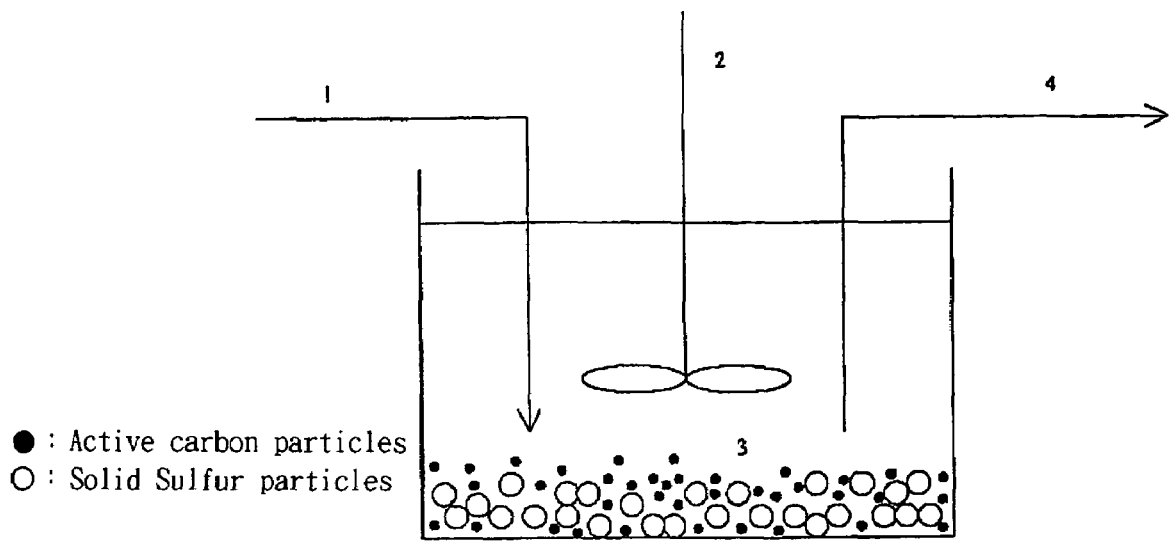
FIG. 1 is a schematic view showing the stabilizing device according to an embodiment of the present invention.

| | |
|---|---|
| L1 | inlet pipe |
| L2 | outlet pipe |
| D2 | agitation device |
| D3 | stabilizing chamber |
| R2 | continuous reaction chamber |
| H1 | inlet |
| H2 | outlet |
| D1 | rectifying cavity |
| L5 | discharge pipe |

DETAILED DESCRIPTION OF THE INVENTION

The present wastewater treatment system and process are described below.

The present invention reduces sulfates in denitrification system with sulfur autotrophic microorganism as primary bacteria by the concept of recycling. Sulfates are recycled by adding active carbon with the use of simultaneous autotrophic and heterotrophic denitrification, therefore sulfate concentration in treated water and also operating cost are reduced.

Particularly, the present invention provides:
1. A process for removing nitrates, organic contaminants and ammonia, and recycling sulfates in wastewater, which comprises:
   (A) a step of feeding wastewater having high concentration of nitrates to be treated into a reaction chamber and well mixing the wastewater in the bottom rectifying cavity;
   (B) a step of feeding the wastewater well mixed in step (A) through cultivated solid sulfur particles and granular active carbon packed in a reaction chamber to treat the wastewater by denitrification with autotrophic microorganism and heterotrophic microorganism
   (C) a step of subjecting the hydrogen sulfide exhausted during the treatment in step (B) through discharge pipe into reaction chamber; and
   (D) a step of discharging the treated wastewater via outlet,
2. The process as described in Item 1, wherein the feeding mode of the wastewater having high concentration of nitrates to be treated is continuous, intermittent or batch.
3. The process as described in Item 1, wherein the autotrophic microorganism are at least one of those selected from the group consisting of *Thiobacillus denitrificans, Thiobacillus versutus, Thiobacillus thyasiris*, and *Thiosphaera pantotropha*.
4. The process as described in Item 1, wherein the heterotrophic microorganism are *Bacillus niacini* or *Staphylococcus* spp.
5. The process as described in Item 1, wherein granular active carbon are added in the reaction chamber for attachment and growth of sulfur-reducing bacteria.

6. The process as described in Item 1, wherein the content ratio of solid sulfur particles (5) to active carbon (C) is 1:1-1:10 by volume.
7. The process as described in Item 1, wherein operating temperature of the reaction chamber is 20-30° C.
8. An apparatus for removing nitrates, organic contaminants and ammonia, and recycling sulfates in wastewater, which comprise:
   a reaction chamber packed with solid sulfur particles and granular
   active carbon therein which is provided for attachment and growth of bacteria;
   an inlet for delivering wastewater in;
   a rectifying cavity for well mixing wastewater;
   an outlet for delivering treated wastewater out; and
   a discharge pipe for recirculating exhausted hydrogen sulfide.
9. The apparatus as described in Item 8, wherein the rectifying cavity is isolated from the packing medium presented in the column by metal wire gauge.
10. The apparatus as described in Item 8, wherein the height ratio of the rectifying cavity with respect to the overall height of column is 1:4.
11. The apparatus as described in Item 8, wherein the operating temperature is 20-30° C.

According to the present invention, a process and a system for treating wastewater which effectively treats wastewater having both high nitrates and low organic carbonaceous sources, and effectively reduces sulfates by-products, is obtained. Particularly, the present invention provides a closed sulfur circulation wastewater treatment system, which combines autotrophic and heterotrophic denitrification to recycle sulfates. The present apparatus and process are described below referring to the accompanying drawings.

Figure 2:
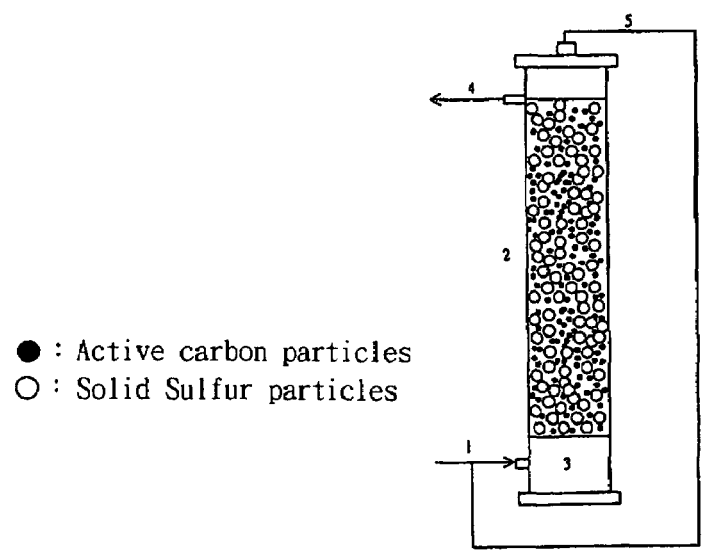

FIG. 1 is a schematic view showing the stabilizing device according to an embodiment of the present invention. FIG. 2 is a schematic view showing the device for wastewater treatment according to an embodiment of the present invention. In FIGS. 1 and 2, L1 indicates inlet pipe, L2 indicates outlet pipe, D2 indicates an agitation device, D3 indicates a stabilizing chamber, R2 indicates a continuous reaction chamber, H1 indicates inlet, H2 indicates outlet, D1 indicates rectifying cavity, L5 indicates discharge pipe.

As shown in FIG. 1, the present apparatus for removing nitrates, organic contaminants and ammonia, and recycling sulfates in wastewater, which comprises a vertical column packed with solid sulfur and granular active carbon inside therein; an inlet at the bottom of the vertical column for delivering wastewater in; a rectifying cavity at the bottom of the column for well mixing wastewater; an outlet at the top of the column for delivering treated wastewater out; and an discharge pipe for recirculating exhausted hydrogen sulfide.

In one aspect of the present invention, firstly the wastewater having high concentration of nitrates to be treated is continuously feeding into the vertical column, is well mixed in the bottom rectifying cavity. The well-mixed wastewater is upwardly passed the column packed with cultivated solid sulfur and granular active carbon to perform bio-reaction for removing nitrates, organic contaminants and ammonia, and recycling sulfates in wastewater. The treated wastewater is eliminated via the outlet, and the hydrogen sulfide exhausted during the treatment is recycled through discharge pipe into o the bottom of reaction chamber.

For the purpose of removing organic carbon, ammonia and nitrates simultaneously and recycling sulfates, according to the present invention, it is possible to pack active carbon inside the vertical column and further pack cultivated solid sulfur particles to remove organic carbon, ammonia and nitrates and produce sulfates by the use of autotrophic and heterotrophic denitrifying bacteria attached on the sulfur particles. The sulfur-reducing bacteria grown inside the absolute anaerobic gaps of active carbon are capable of reducing sulfates produced by the autotrophic denitrifying bacteria into hydrogen sulfide. Part of the denitrifying bacteria use hydrogen sulfide as electron donor and re-oxidize it into sulfates. Therefore, sulfur based compounds can be recycled repeatedly and thus the reduction of sulfates and performance of denitrification of the treated wastewater are achieved.

In another aspect of the present invention, the sulfur autotrophic microorganism are used as primary bacteria to reduce sulfates in the denitrification system. By adding active carbon and utilization of simultaneous autotrophic-heterotrophic denitrification, sulfates are recycled and the reduction of sulfates of the treated wastewater is achieved and the operating cost are reduced. Particularly, the present invention is directed to a system for treating wastewater in which the medium suitable for the growth of microorganisms capable of bio-purifying wastewater is packed inside the reaction chamber.

According to the present process, the medium added for the attachment of sulfur-reducing bacteria used in simultaneous autotrophic-heterotrophic denitrification is not specifically limited, and any medium used in conventional bio treatments, e.g. granular or powdery active carbon, is useful. Granular active carbon is preferable in view of enhancement to the growth of the microorganisms as sulfur-reducing bacteria and the like, usage life, and ease of operation.

Further, according to the present process, the elemental sulfur source for autotrophic denitrifying bacteria is mainly solid sulfur particles with variable size and radius ranging 2-4 mm, made by melting sulfur powders. The purity of the sulfur powders for melt-made sulfur particles is laboratory or industry grade at 90% 100%.

Further, according to the present process, the present system is useful with complete utilization only by planting. The planting source is the active sludge from regular or industrial wastewater treatment plants. The primary detemination principle is at least having both autotrophic and heterotrophic denitrifying bacteria. The autotrophic denitrifying bacteria mainly comprise *Thiobacillus denitrificans, Thiobacillus versutus, Thiobacillus thyasiris*, and *Thiosphaera pantotropha*, etc. The heterotrophic denitrifying bacteria mainly comprise *Bacillus niacini* or *Staphylococcus* spp, etc.

Further, according to the present process, the ratio by volume of sulfur particles and active carbon is variable and mainly depends on the composition of the wastewater to be treated. The ratio by volume of sulfur particles and active carbon can be 1:1 to 10:1.

Further, according to the present process, the reaction temperature is not specifically limited. However, it is preferable in the range of 20-30° C., more preferable in the range of 22-28° C., in view of ease of operation. Additionally, it can be operated at constant or variable temperature.

Further, the rectifying cavity used in the present invention is preferably isolated from the packing in the column by wire gauge made of metals or plastics. Also, the mesh size of the wire gauge is not specifically limited as long as the effects of present invention are not compromised. Additionally, the height of the rectifying cavity used in the present invention is below ¼ of the whole column, i.e., the height ratio of the rectifying cavity with respect to the overall height of column is below 4:1, in view of well mixing and ease of operation.

According to the present invention, the type of the wastewater treatment apparatus is not specifically limited, and can be vertical or lying. It is preferable to use vertical wastewater treatment apparatus in view of space utilization. Also, according to the present invention, the wastewater can be fed continuously or intermittently. Further, the feeding position can be at the lower, higher or bottom part of the column. Preferably it is fed through the lower or bottom part of the vertical column.

EXAMPLE

The following shows the examples of the present invention, however, the present invention is not limited thereto.

Example 1

Cultivation

To a 1 liter reaction vessel equipped with agitator, 800 ml of liquid, 320 ml of sulfur and proper amount of culture medium A introduced. In the first stage, wastewater 170 ml per day was semi-continuously batched, and 40, 80, 120, and 160 ml of active carbon were introduced respectively. The cultivation of culture was conducted in anaerobic condition of temperature of 30° C. and hydraulic retention time (HRT) of 7.5 days. The qualities of the influent and effluent water were determined, and the amount variation of the hydrogen sulfide produced by the cultivated sulfur autotrophic microorganism and heterotrophic microorganism on the active carbon was observed.

THE EFFECTS OF THE PRESENT INVENTION

As described above, according to the present invention, the sulfur-reducing bacteria grown inside the absolute anaerobic gaps of active carbon are capable of reducing sulfates, produced by the autotrophic denitrifying bacteria, into hydrogen sulfide. Part of the denitrifying bacteria use hydrogen sulfide as electron donor and re-oxidize it into sulfates. Therefore, sulfur based compounds are recycled repeatedly and the effects of reducing sulfates in the treated wastewater and enhancing denitrification are achieved. Thus, according to the present process with the use of the present apparatus, cultivated solid sulfur and granular active carbon are packed inside vertical column, wastewater is continuously fed into the bottom of the column, autotrophic and heterotrophic denitrifying bacteria attached on the sulfur particles are capable of removing organic carbon, ammonia and nitrates and producing sulfates, i.e., removing organic carbon, ammonia and nitrates and recycling sulfates.

We claim:

1. A process for removing nitrates, organic contaminants and ammonia, and recycling sulfates in wastewater, which comprises:
    (A) a step of feeding wastewater having high concentration of nitrates to be treated into a reaction chamber and well mixing the wastewater at a bottom rectifying cavity;
    (B) a step of feeding the wastewater well mixed in step (A) through cultivated solid sulfur particles and granular active carbon packed in said reaction chamber, said active carbon having anaerobic gaps and sulfur-reducing bacteria in said gaps, to treat the wastewater by denitrification with autotrophic microorganism, wherein the said solid sulfur particles and granular active carbon are mixed;

(C) a step of redirecting hydrogen sulfide exhausted during the treatment in step (B) through a discharge pipe to reaction chamber; and (D) a step of discharging the treated wastewater via outlet.

2. The process as described in claim 1, wherein the feeding mode of the wastewater having high concentration of nitrates to be treated is continuous, intermittent or batch.

3. The process as described in claim 1, wherein the autotrophic microorganism are at least one of those selected from the group consisting of *Thiobacillus denitrificans, Thiobacillus versutus, Thiobacillus thyasiris*, and *Thiosphaera pantotropha*.

4. The process as described in claim 1, wherein the heterotrophic microorganism are *Bacillus niacini* or *Staphylococcus* spp.

5. The process as described in claim 1, wherein granular active carbon is added in the reaction chamber for attachment and growth of sulfur-reducing bacteria.

6. The process as described in claim 1, wherein the content ratio of solid sulfur particles (S) to active carbon (C) is 1:1~1:10 by volume.

7. The process as described in claim 1, wherein operating temperature of the reaction chamber is 20~30° C.

* * * * *